(12) United States Patent
Feng et al.

(10) Patent No.: US 7,903,585 B2
(45) Date of Patent: Mar. 8, 2011

(54) TOPOLOGY DISCOVERY OF A PRIVATE NETWORK

(75) Inventors: FuJen Feng, Fremont, CA (US); Ming Chow, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 915 days.

(21) Appl. No.: 11/355,730

(22) Filed: Feb. 15, 2006

(65) Prior Publication Data
US 2007/0189190 A1    Aug. 16, 2007

(51) Int. Cl.
*H04L 12/28* (2006.01)
*H04L 12/56* (2006.01)

(52) U.S. Cl. .................. 370/255; 370/351; 370/401

(58) Field of Classification Search .............. 370/254, 370/255, 351, 401
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,229,988 A | 7/1993 | Marbaker et al. |
| 5,371,852 A | 12/1994 | Attanasio et al. |
| 5,473,599 A | 12/1995 | Li et al. |
| 5,572,528 A | 11/1996 | Shuen |
| 5,619,552 A | 4/1997 | Karppanen et al. |
| 5,729,537 A | 3/1998 | Billstrom |
| 5,793,763 A | 8/1998 | Mayes et al. |
| 5,825,759 A | 10/1998 | Liu |
| 5,835,696 A | 11/1998 | Hess |
| 5,862,345 A | 1/1999 | Okanoue et al. |
| 5,862,451 A | 1/1999 | Grau et al. |
| 5,943,604 A | 8/1999 | Chen et al. |
| 6,078,575 A | 6/2000 | Dommety et al. |
| 6,108,300 A | 8/2000 | Coile et al. |
| 6,118,784 A | 9/2000 | Tsuchiya et al. |
| 6,195,705 B1 | 2/2001 | Lueng |
| 6,331,984 B1 | 12/2001 | Luciani |
| 6,418,476 B1 | 7/2002 | Luciani |
| 6,487,605 B1 | 11/2002 | Leung |
| 6,493,341 B1 | 12/2002 | Datta et al. |
| 6,512,774 B1 | 1/2003 | Vepa et al. |
| 6,751,191 B1 | 1/2003 | Kanekar et al. |

(Continued)

FOREIGN PATENT DOCUMENTS
WO    WO 02/073933    11/2002

OTHER PUBLICATIONS

Nordmark, Stateless IP/ICMP Translation Algorithm (SIIT), RFC 2765, 26 pages, Feb. 2000.

(Continued)

*Primary Examiner* — Jayanti K Patel
*Assistant Examiner* — Saad Hassan
(74) *Attorney, Agent, or Firm* — Stolowitz Ford Cowger LLP (57) ABSTRACT

The present invention relates to a method and system for determining devices connected to a private network through a gateway. A Network Management System (NMS) through the use of inquiries and Port Address Translation (PAT) commands is able to determine the topology of the network of devices within a private network and thus communicate with them. This is achieved through the use of Port Address Translation (PAT) initiated by the NMS to set a port for each device connected to the gateway.

18 Claims, 5 Drawing Sheets

U.S. PATENT DOCUMENTS

| | | |
|---|---|---|
| 6,580,717 B1 | 6/2003 | Higuchi et al. |
| 6,775,235 B2 | 8/2004 | Datta et al. |
| 6,779,039 B1 | 8/2004 | Bommareddy et al. |
| 6,801,949 B1 | 10/2004 | Bruck et al. |
| 6,839,829 B1 | 1/2005 | Darruwalla |
| 6,865,184 B2 | 3/2005 | Thubert et al. |
| 6,885,667 B1 | 4/2005 | Wilson |
| 7,042,876 B1 | 5/2006 | Jayasenan |
| 7,047,314 B2 | 5/2006 | Sato et al. |
| 7,058,007 B1 | 6/2006 | Darruwalla |
| 7,068,712 B1 | 6/2006 | Zang |
| 7,227,863 B1 | 6/2007 | Leung |
| 7,280,557 B1 * | 10/2007 | Biswas et al. ............... 370/465 |
| 2002/0120697 A1 | 8/2002 | Generous et al. |
| 2002/0154624 A1 | 10/2002 | Oishi et al. |
| 2003/0110292 A1 | 6/2003 | Takeda et al. |
| 2003/0131262 A1 | 7/2003 | Goddard |
| 2003/0200463 A1 | 10/2003 | McCabe |
| 2003/0233576 A1 | 12/2003 | Maufer et al. |
| 2004/0001509 A1 | 1/2004 | Zhang et al. |
| 2004/0076180 A1 * | 4/2004 | Satapati et al. ............... 370/467 |
| 2004/0103212 A1 | 5/2004 | Takeuchi et al. |
| 2004/0179508 A1 | 9/2004 | Thubert et al. |
| 2004/0179532 A1 | 9/2004 | Thubert et al. |
| 2004/0179536 A1 | 9/2004 | Thubert et al. |
| 2004/0190549 A1 | 9/2004 | Huitema |
| 2004/0233916 A1 | 11/2004 | Takeuchi et al. |
| 2004/0240468 A1 | 12/2004 | Chin et al. |
| 2005/0089025 A1 | 4/2005 | Boyer et al. |
| 2005/0243800 A1 * | 11/2005 | Horoschak et al. ............ 370/352 |
| 2005/0286553 A1 * | 12/2005 | Wetterwald et al. ........... 370/466 |
| 2006/0031394 A1 * | 2/2006 | Tazuma ...................... 709/217 |
| 2006/0077988 A1 * | 4/2006 | Cheng et al. ................. 370/401 |
| 2006/0092931 A1 * | 5/2006 | Walter et al. ................. 370/389 |
| 2006/0101340 A1 * | 5/2006 | Sridhar et al. ................ 715/734 |
| 2006/0236118 A1 * | 10/2006 | Goldberg ..................... 713/185 |

OTHER PUBLICATIONS

Hagino et al., An IPv6-to-IPv4 Transport Relay Translator, RFC 3142, 11 pages, Jun. 2001.

Carpenter et al., "Connecting IPv6 Routing Domains Over the IPv4 Internet", The Internet Protocol Journal, 3:1, Mar. 2000, pp. 1-10.

Tsirtsis et al., "Network Address Translation—Protocol Translation (NAT-PT)", Network Working Group, Request for Comments: 2766, Feb. 2000, pp. 1-21.

Carpenter et al., "Connection of IPv6 Domains via IPv4 Clouds", Network Working Group, Request for Comments: 3056, Feb. 2001, pp. 1-22.

Rekhter et al, "Address Allocation for Private Internets", Network Working Group, Request for Comments: 1918, Feb. 1996.

Srisuresh et al., "IP Network Address Translator (NAT) Terminology and Considerations", Network Working Group, Request for Comments: 2663, Aug. 1999.

Savola, "A View on IPv6 Transition Architecture", Internet Engineering Task Force, Internet Draft, <draft-savola-v6ops-transarch-03.txt>, Jan. 2004, pp. 1-21.

Hain, "Architectural Implications of NAT", Network Working Group, Request for Comments: 2993, Nov. 2000.

Srisuresh et al., "Traditional IP Network Address Translator (Traditional NAT)", Network Working Group, Request for Comments: 3022, Jan. 2001.

Hinden et al., "Internet Protocol Verion 6 (IPv6) Addressing Architecture", Network Working Group, Request for Comments: 3513, Apr. 2003.

Troan et al., "IPv6 Prefix Options for Dynamic Host Configuration Protocol (DHCP) version 6", Network Working Group, Request for Comments: 3633, Dec. 2003.

U.S. Appl. No. 10/291,418, filed Nov. 12, 2002, Metzger.

Deering et al., "Internet Protocol, Version 6 (IPv6) Specification", Network Working Group, Request for Comments: 2460, Dec. 1998.

K Egevang et al., "The IP Network Address Translator (NAT)", Network Working Group, pp. 1-10, May 1994.

Y. Rekhter et al., "Address Allocation for Private Internets," RFC: 1918, Network Working Group, Feb. 1996.

P. Srisuresh, et al. "Load Sharing Using IP Network Address Translation (LSNAT))," RFC 2391, Network Working Group, Aug. 1999.

E. Gerich, "Guidelines for Management of IP Address Space," RFC:1466, Network Working Group, May 1993.

J. Moy, RFC 1247 "OSPF Version 2", Jul. 19, 1991.

D. Oran, RFC 1142 OSI IS-IS Intra-domain Routing Protocol, Feb. 1990.

G. Tsirtsis, P. Srisuresh, "Network Address Translation-Protocol Translation (NAT-PT)" RFC 2766, Feb. 2000.

T. Li, B. Cole, P. Morton, D. Li, Cisco Hot Standby Router Protocol (HSRP), Mar. 1998.

Chambless, et al., "Home Agent Redundancy Protocol (HARP), " Oct. 27, 1997.

C. Perkins, Network Working Group, RFC 2002 "IP Mobility Support," Oct. 1996.

C.E. Perkins and T. Jagannadh, "DHCP for Mobile Networking with TCP/IP," IBM, Watson Research Center IEEE, Apr. 1995.

E. Nordmark, "Stateless IP/ICMP Translation Algorithm (SIIT)", RFC 2765, Online, Feb. 2000.

International Search Report for PCT/US03/32959, dated Mar. 25, 2004.

Carpenter et al., "Connection of IPv6 Domains via IPv4 Clouds", Network Working Group, Request for Comments: 3056, Feb. 2001.

Luciani et al., "Server Cache Synchronization Protocol (SCSP)" RFC 2334, Network Working Group, Mar. 1994.

Moy, J., OSPF Version 2, RFC 1583, Network Working Group, Mar. 1994.

* cited by examiner

TOPOLOGY DISCOVERY OF A PRIVATE NETWORK

FIELD OF THE INVENTION

The present invention relates generally to the discovery of the topology of a private network by a Network Management System (NMS) when the NMS is not directly connected to the private network.

BACKGROUND OF THE INVENTION

Through the use of the Simple Network Management Protocol (SNMP) and other discovery protocols such as Cisco Discovery Protocol (CDP), it is possible for a Network Management System (NMS) to discover the topology of a network. However, there is a limitation in such an approach as the devices in the network cannot be discovered if they are on a private network as defined by RFC 1918 of the Internet Engineering Task Force (IETF).

The present invention addresses the need for a system and method for discovering the devices within a private network by an NMS not contained within the private network.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF EMBODIMENTS OF THE INVENTION

Figure 1:
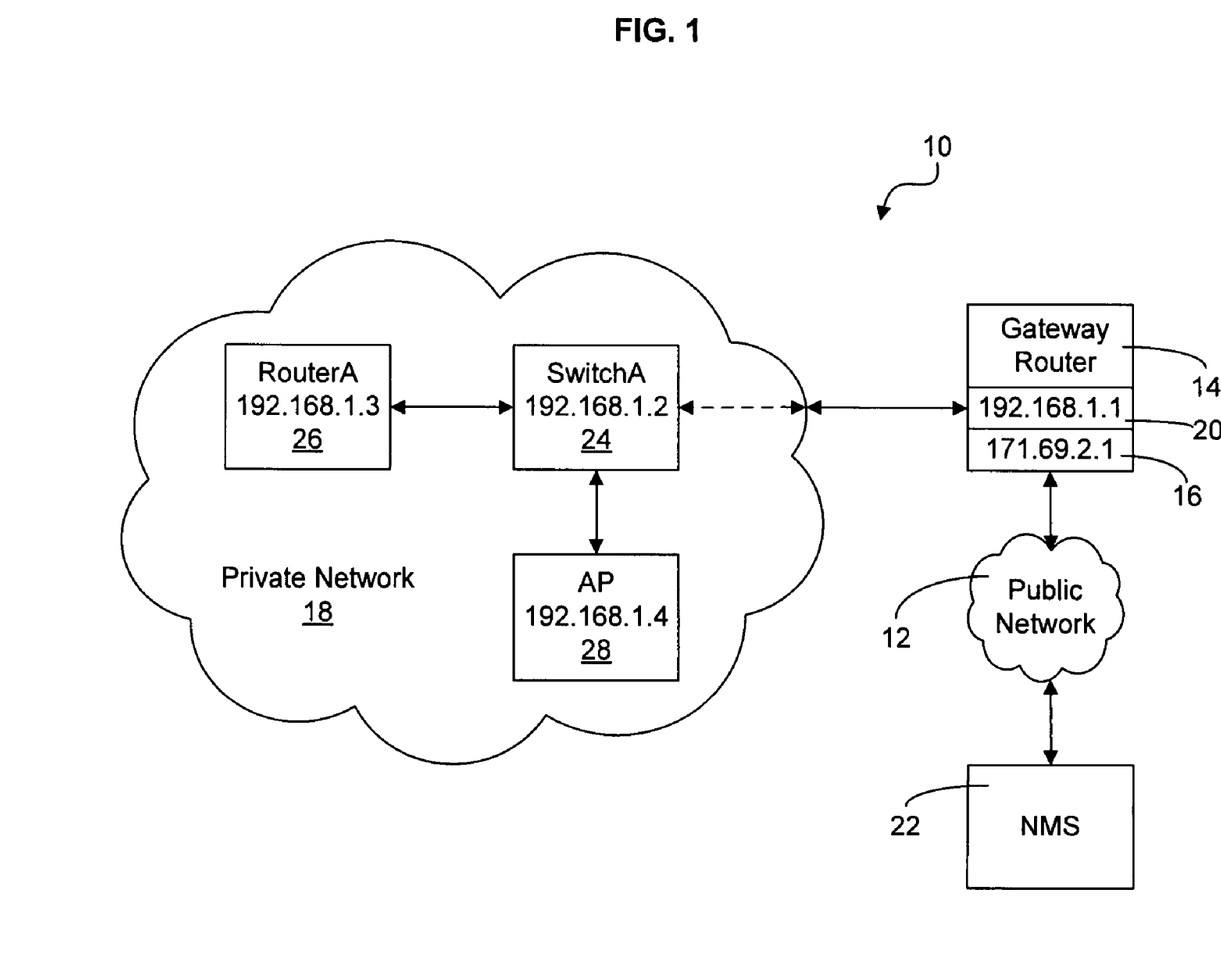
FIG. 1 is a block diagram illustrating an example of a computer network.

For the purpose of describing the prior art means of discovering the topology of a network as well as how an embodiment of the present invention achieves this task we refer first to FIG. 1. FIG. 1 is a block diagram illustrating an example of a computer network and is shown generally as 10.

Network 10 includes a public network 12 connected to a gateway router 14 via an example IP address of 171.69.2.1, shown as feature 16. Gateway router 14 is further connected to a private network 18 via an example IP address of 192.168.1.1, shown as feature 20.

Gateway router 14 acts as a gateway between public network 12 and private network 18. In one embodiment gateway router 14 is a Network Address Translation/Port Address Translation (NAT/PAT) router. NAT/PAT allows a router to rewrite any of the source addresses, destination addresses or ports of IP packets as the pass through the router. Typically this is done to allow devices connected to private network 18 to utilize a single IP address (feature 16) to connect to public network 12. Examples of a private network 18 include a Local Area Network (LAN) and a Wide Area Network (WAN). These private networks 18 are established by an organization that wishes to avoid direct connection between devices in private network 18 and public network 12.

Network Management System (NMS) 22 is connected to public network 12. NMS 22 serves to monitor and provide services to and from the devices connected to public network 12. Part of the function of NMS 22 is to discover and connect to devices through public network 12. By way of example, the devices shown in FIG. 1 are: SwitchA (24), RouterA (26) and Access Point (AP 28). AP 28 is a device that communicates with wireless clients having access to private network 18. As devices 24, 26 and 28 are within private network 18, NMS 22 is unable to discover them.

Figure 2:
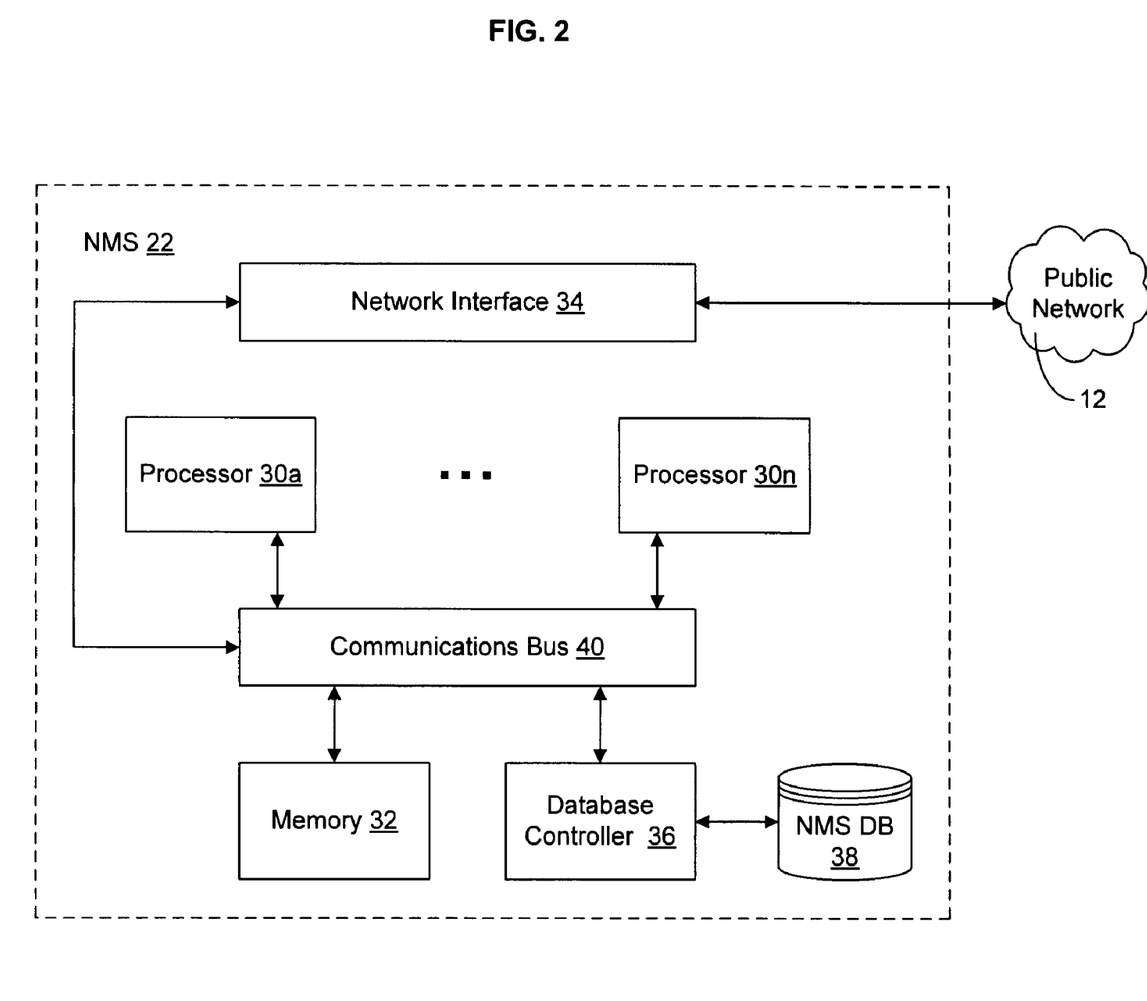
FIG. 2 is a block diagram of an NMS.

We now refer to FIG. 2 a block diagram of an NMS 22. The components of NMS 22 are simply examples of how a generic computing device may be configured to implement NMS 22. NMS 22 comprises one or more processors 30a to 30n. Each processor 30a to 30n is capable of running computing instructions to execute the functions as described with regard to embodiments of the present invention. Memory 32 provides temporary or permanent storage for instructions and data required by processors 30a to 30n. Network interface 34 serves to connect NMS 22 to public network 12 through the use of a communication protocol of choice, an example of which would be TCP/IP or Ethernet. Database controller 36 serves to allow processors 30a to 30n to store and retrieve information regarding private networks 18 and gateway routers 14 to and from NMS database 38. Communications bus 40 allows for communication between the components of NMS 22, namely processors 30a to 30n, memory 32, network interface 34 and database controller 36.

Figure 3:
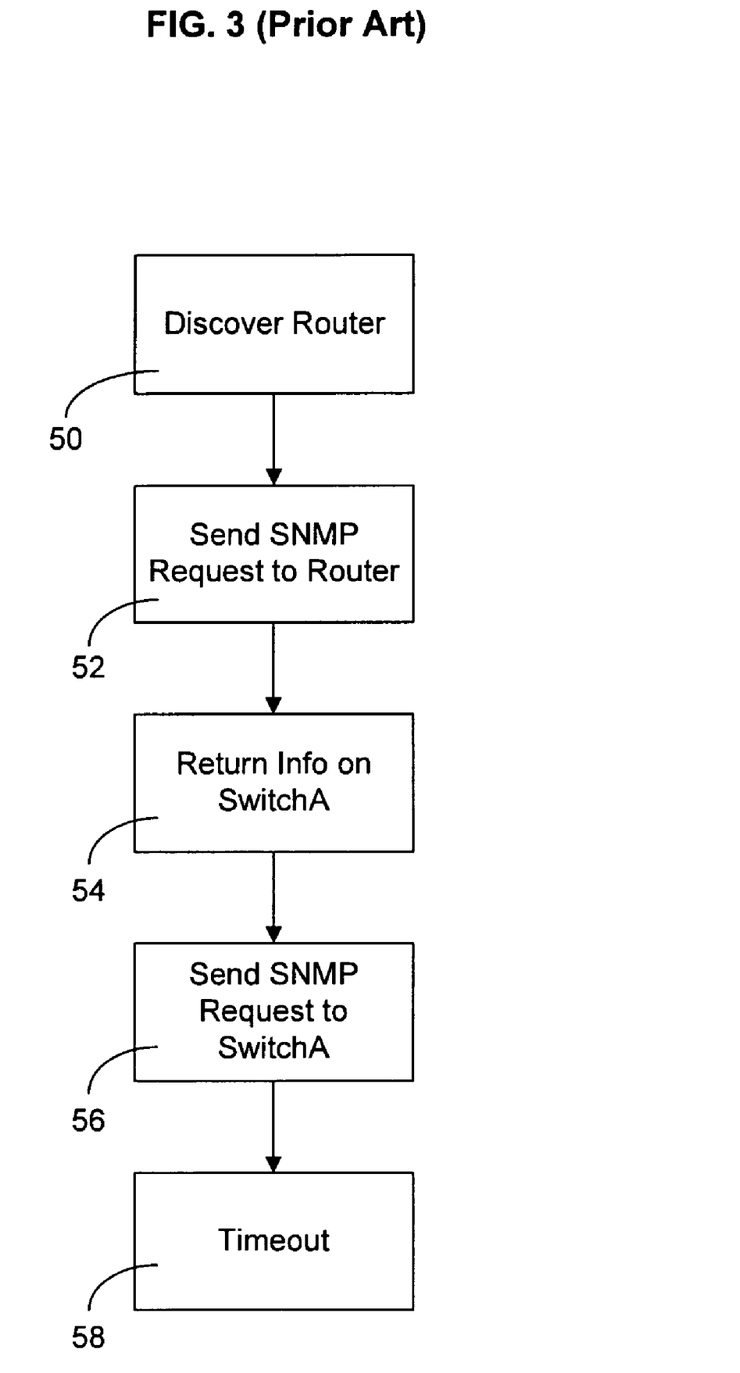
FIG. 3 is a flowchart of a prior art discovery process.

To illustrate the problem of discovering devices within private network 18 by NMS 22 we now refer to FIG. 3, a flowchart of a prior art discovery process.

Beginning at step 50, NMS 22 discovers gateway router 14 with an example IP address of 171.69.2.1 (feature 16 of FIG. 1). At step 52 NMS 22 sends a Simple Network Management Protocol (SNMP) request message to gateway router 14 to obtain information about devices connected to gateway router 14. At step 54 gateway router 14 informs NMS 22 that it is connected to SwitchA 24. At step 56 NMS 22 sends an SNMP request to SwitchA 24 via example IP address 192.168.1.1, to obtain information about devices connected to SwitchA 24. The request sent at step 56 will eventually timeout at step 58 as SwitchA 24 is within private network 18 and as such cannot provide information on RouterA 26 and AP 28.

Figure 4:
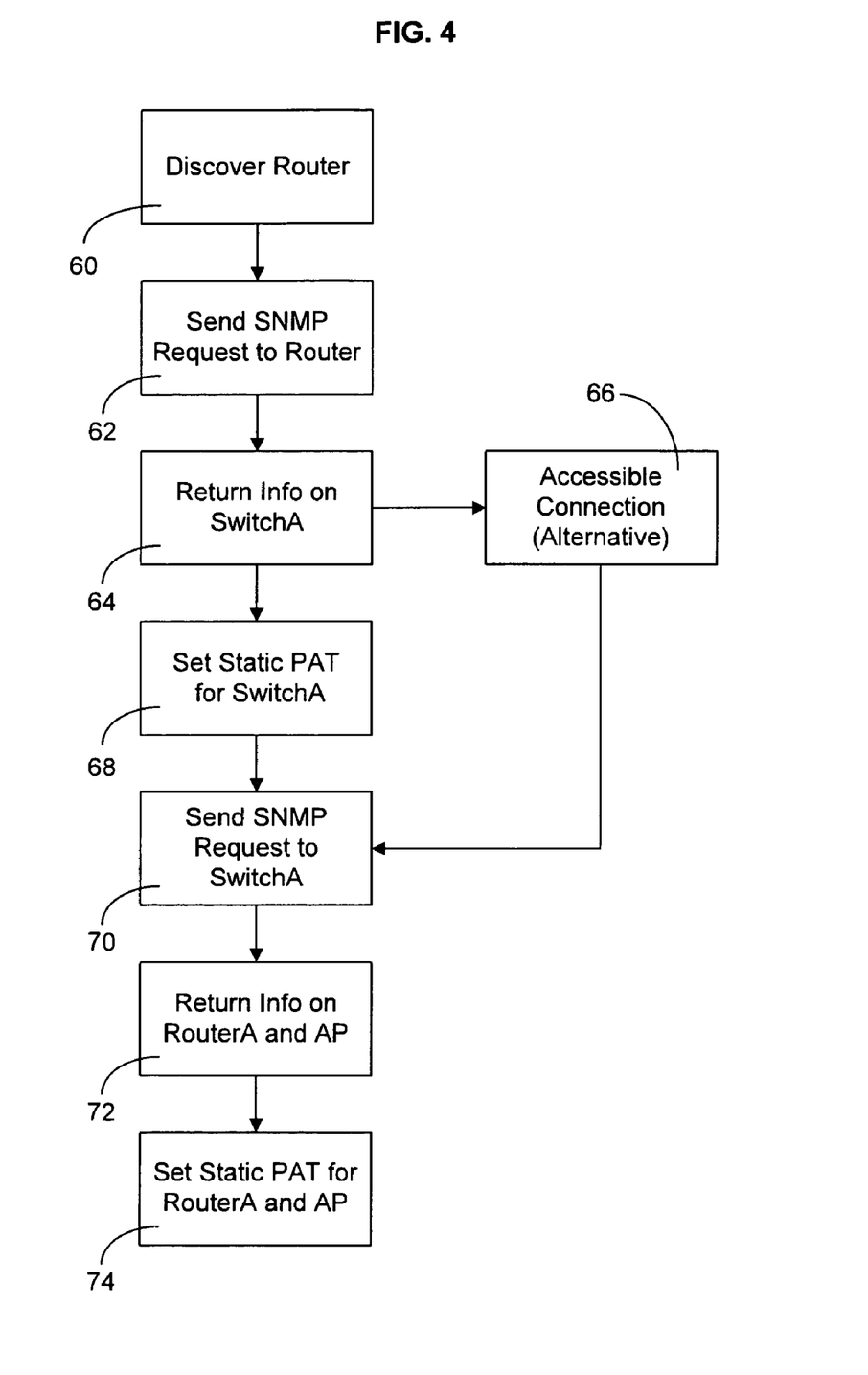
FIG. 4 is a flowchart of an embodiment of a discovery process.

Referring now to FIG. 4 a flowchart of an embodiment of a discovery process as implemented by the present invention is shown.

Beginning at step 60 NMS 22 discovers gateway router 14 with an example IP address of 171.69.2.1. At step 62 NMS 22 sends a Simple Network Management Protocol (SNMP) message to gateway router 14 to obtain information about devices connected to gateway router 14. At step 64 gateway router 14 informs NMS 22 that it is connected to SwitchA 24. From the information returned at step 64 NMS 22 is aware that SwitchA 24 is a private address. At this point processing moves to step 68 but an alternative embodiment may be utilized as shown in step 66. In an alternative embodiment if NMS 22 determines that SwitchA 24 has a private address it may choose to check whether the private address is accessible or not. This can be done by sending a ping or SNMP message to the private address of SwitchA 24. If the private address of SwitchA 24 is reachable, the NMS 22 may chose to communicate directly with SwitchA 24 and avoid step 68 by moving directly to step 70. At step 68 NMS 22 utilizes telnet/ssh to establish a static PAT entry for SwitchA 24 with gateway router 14. This is done via the following example PAT command, this example is specific to Cisco Internetwork Operating System, other manufacturers may use a different syntax.

ip nat inside source static udp 192.168.1.2 161 171.69.2.1 10000

This now permits NMS 22 to reach SwitchA 24 by sending an SNMP request to gateway router 14 (171.69.2.1) port 10000, as shown in step 70.

At step 72 SwitchA 24 returns information on its neighbours RouterA 26 and AP 28 to NMS 22. At step 74 NMS 22 utilizes telnet/ssh to establish static PAT entries for RouterA 26 and AP 28 with gateway router 14. This is done via the following example PAT commands:

ip nat inside source static udp 192.168.1.3 161 171.69.2.1 10001 ip nat inside source static udp 192.168.1.4 161 171.69.2.1 10002

The steps 64 to 74 are then repeated for RouterA 26 and AP 28 and their neighbours until all devices behind private network 18 are discovered.

The process described with reference to FIG. 4 also allows for the addition of services to the devices connected to private network 18. For example to add ssh services to SwitchA 24, RouterA 26 and AP 28 the following example PAT commands may be used:

ip nat inside source static tcp 192.168.1.2 22 171.69.2.1 20000 ip nat inside source static tcp 192.168.1.3 22 171.69.2.1 20001 ip nat inside source static tcp 192.168.1.4 22 171.69.2.1 20002

Similarly to add telenet services to SwitchA 24, RouterA 26 and AP 28 the following example PAT commands may be used:

ip nat inside source static tcp 192.168.1.2 23 171.69.2.1 30000 ip nat inside source static tcp 192.168.1.3 23 171.69.2.1 30001 ip nat inside source static tcp 192.168.1.4 23 171.69.2.1 30002

The IP addresses and PAT commands mentioned in this description apply equally to any version of IP, such as IPv4 and IPv6 as defined by the Internet Engineering Task Force (IETF) in RFC numbers 791, 2373 and 2374.

The references to specific IP addresses are meant only as examples of how an embodiment of the present invention may be utilized. The example disclosed uses a gateway router 14 but applies equally to any device that acts as a gateway between public network 12 and private network 18.

The present invention provides for the opening of ports on a private network 18 to a public network 12. Providing this functionality does provide security risks. These security risks may be mitigated in several ways. We refer now to FIG. 5, a block diagram illustrating the logical flow for the mitigation of security risks. Any of the steps described with reference to FIG. 5 may be implemented individually or in combination.

Figure 5:
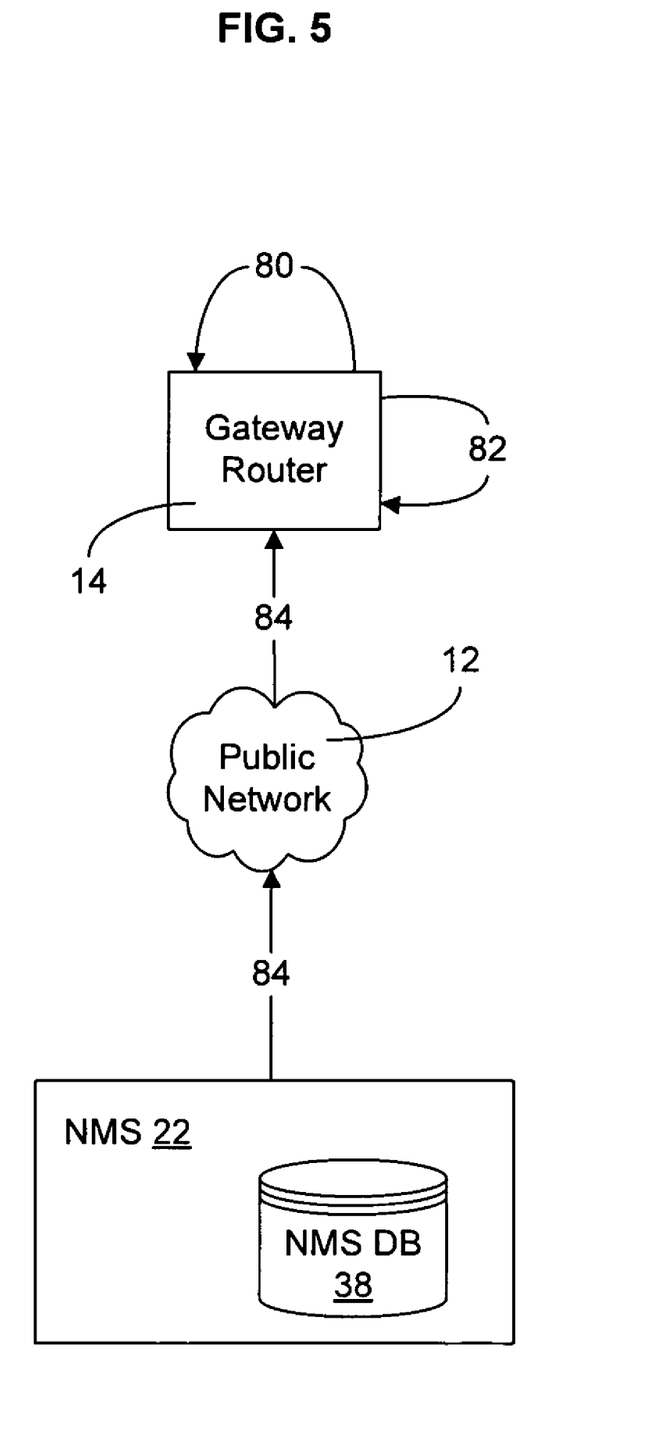
FIG. 5, a block diagram illustrating the logical flow for the mitigation of security risks.

At step 80 gateway router 14 may set the value of the SNMP community string to a value other than the default of "public". The SNMP community string is a password like string in an SNMP message. When gateway router 14 receives an SNMP message from NMS 22 it will check the community string to determine if it matches the community string configured for gateway router 14. If it does not match, gateway router 14 will ignore the message.

At step 82 gateway router 14 may configure an access control list and a command authorization list. The access control list would only permit access from NMS 22 and the administrators of gateway router 14. The command authorization list would allow only a limited set of commands to be accepted from NMS 22.

At step 84, NMS 22 removes PAT entries on gateway router 14 after discovery of the devices in private network 18. NMS 22 utilizes NMS database 38 to map the discovered device to its PAT entry.

Another issue to consider in implementing the present invention is the selection of an unused port number to configure a PAT on gateway router 14 for NMS 22 to access devices within private network 18. The inventors propose three methods for doing this. In the first method NMS 22 defines an infrequently used port range for PAT to reduce the collision of ports. For example, a port range of 50,000 to 59,999. This method does not eliminate the collision of ports but does mitigate the possibility. In the second method when NMS 22 is configuring a PAT on gateway router 14 it can examine the NAT/PAT translation table maintained by gateway router 14. By examining the table NMS 22 can select a port from a range which is not in use. However, this requires transfer of the table from gateway router 14 to NMS 22 which consumes network and processor time. Further another process may bind to the port eventually selected while the transfer and examination of the table is being made. The third method is the most robust. In this embodiment a secondary public IP address is configured to the public interface 16 of gateway router 14. This secondary address is solely for the use of NMS 22 to configure PAT. When NMS 22 discovers that gateway router 14 has configured this second address by any number of means, for example by parsing the configuration of gateway router 14, it will use the secondary address and an unassigned number from an infrequently used port range to configure PAT. Since this secondary address will be used only by NMS 22 there are no port collision issues.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:

receiving a discovery request from a Network Management System (NMS) transmitted to a public internet Protocol (IP) address associated with a private network, wherein said discovery request includes a request to identify devices of said private network, and wherein said NMS is connected with a public network;

identifying said devices of said private network;

transmitting a private IP address for each of said devices to said NMS;

receiving an access request from said NMS to add a Port Address Translation (PAT) entry for one or more of said devices, wherein said access request includes said private IP address and designates a port for communication with said one or more devices, and wherein said access request is accompanied by a password;

verifying said password and adding said PAT entry to a translation table, wherein said PAT entry includes said private IP address and said designated port;

receiving a second discovery request from said NMS to said designated port, wherein said second discovery request includes a request to identify additional devices known by said one or more devices;

forwarding said second discovery request to said one or more devices to additionally identify devices of said private network and unknown to the NMS; and removing said PAT entry from said translation table after said one or more devices have been discovered by said NMS.

2. The method of claim 1, wherein said password comprises a Simple Network Management Protocol.

3. The method of claim 1, further comprising configuring both an access control list and a command authorization list to allow a limited set of commands from an authorized NMS.

4. The method of claim 1, further comprising configuring a unique IP address for communication with said NMS to add said PAT entry.

5. The method of claim 1, wherein said access request includes an identification of said designated port.

6. The method of claim 1, wherein said discovery request is received at a public IP address of a router, and wherein said router acts as a gateway between said public network and said private network.

7. The method of claim 6, wherein said PAT entry maps said private IP address of said one or more devices to said public IP address of said router.

8. The method of claim 1, wherein access to said one or more devices from said public network is restricted to said designated port.

9. A network management system (NMS) comprising one or more processors, wherein said one or more processors are configured to:
   transmit a discovery request to a public Internet Protocol (IP) address of a gateway, wherein said gateway connects a public network of said NMS to a private network including one or more devices, and wherein an identity of said one or more devices are unknown to said NMS when said discovery request is transmitted;
   receive a private IP address for each of said one or more devices in response to said discovery request, wherein said private IP address discloses said identity to said NMS;
   transmit an access request to said gateway to add a Port Address Translation (PAT) entry for said one or more devices, wherein said PAT entry includes said private IP address and a designated port of said gateway;
   transmit a second discovery request to said designated port, wherein said second discovery request is routed to said one or more devices;
   receive an identification of additional devices connected to said one or more devices in response to said second discovery request, wherein the additional devices are in the private network and are unknown to the NMS; and
   remove said PAT entry once the one or more devices referenced by said PAT entry have been discovered.

10. The system of claim 9, wherein said one or more processors are further configured to set a Simple Network Management Protocol (SNMP) community string in said gateway to a value not equal to public.

11. The system of claim 9, wherein said one or more processors are further configured to establish both an access control list and a command authorization list for said NMS to allow a limited set of commands from an authorized NMS.

12. The system of claim 9, wherein said one or more processors are further configured to maintain an NMS database to map each of said one or more devices to its PAT entry.

13. The system of claim 9, wherein said one or more processors are further configured to select said designated port on said gateway from a set of infrequently used port numbers.

14. The system of claim 9, wherein said one or more processors are further configured to access a port translation table residing on said gateway for determining said designated port.

15. The system of claim 9, wherein said one or more processors are further configured to provide a unique IP address solely for communication between said gateway and said NMS.

16. The system of claim 9, wherein a different port of said private network is designated for each of said additional devices.

17. The system of claim 9, wherein said access request comprises a telnet or secure shell (ssh) encrypted protocol.

18. A non-transitory computer readable medium having stored thereon computer executable instructions that, if executed by a system, cause the system to perform a method for determining a topology of a private network from a public network, said method comprising: querying a gateway to discover private network devices to which it is connected;
   receiving a private Internet Protocol (IP) address for each of said private network devices in response to said gateway query;
   transmitting a request to said gateway to configure a static PAT entry for one or more of said private network devices, wherein said request includes said private IP address and designates a gateway port;
   querying said one or more private network devices through the use of said PAT entry and said designated gateway port to discover additional devices to which said private network devices are connected, wherein the additional devices are in the private network and the gateway is outside the private network; and
   transmitting a request to said gateway to remove said PAT entry if one or more additional devices are discovered.

* * * * *

UNITED STATES PATENT AND TRADEMARK OFFICE
CERTIFICATE OF CORRECTION

| | |
|---|---|
| PATENT NO. | : 7,903,585 B2 |
| APPLICATION NO. | : 11/355730 |
| DATED | : March 8, 2011 |
| INVENTOR(S) | : Feng et al. |

It is certified that error appears in the above-identified patent and that said Letters Patent is hereby corrected as shown below:

At column 5, line 5, please replace "Protocol." with --Protocol (SNMP) community string.--.

Signed and Sealed this
Thirty-first Day of July, 2012

David J. Kappos
*Director of the United States Patent and Trademark Office*